UNITED STATES PATENT OFFICE.

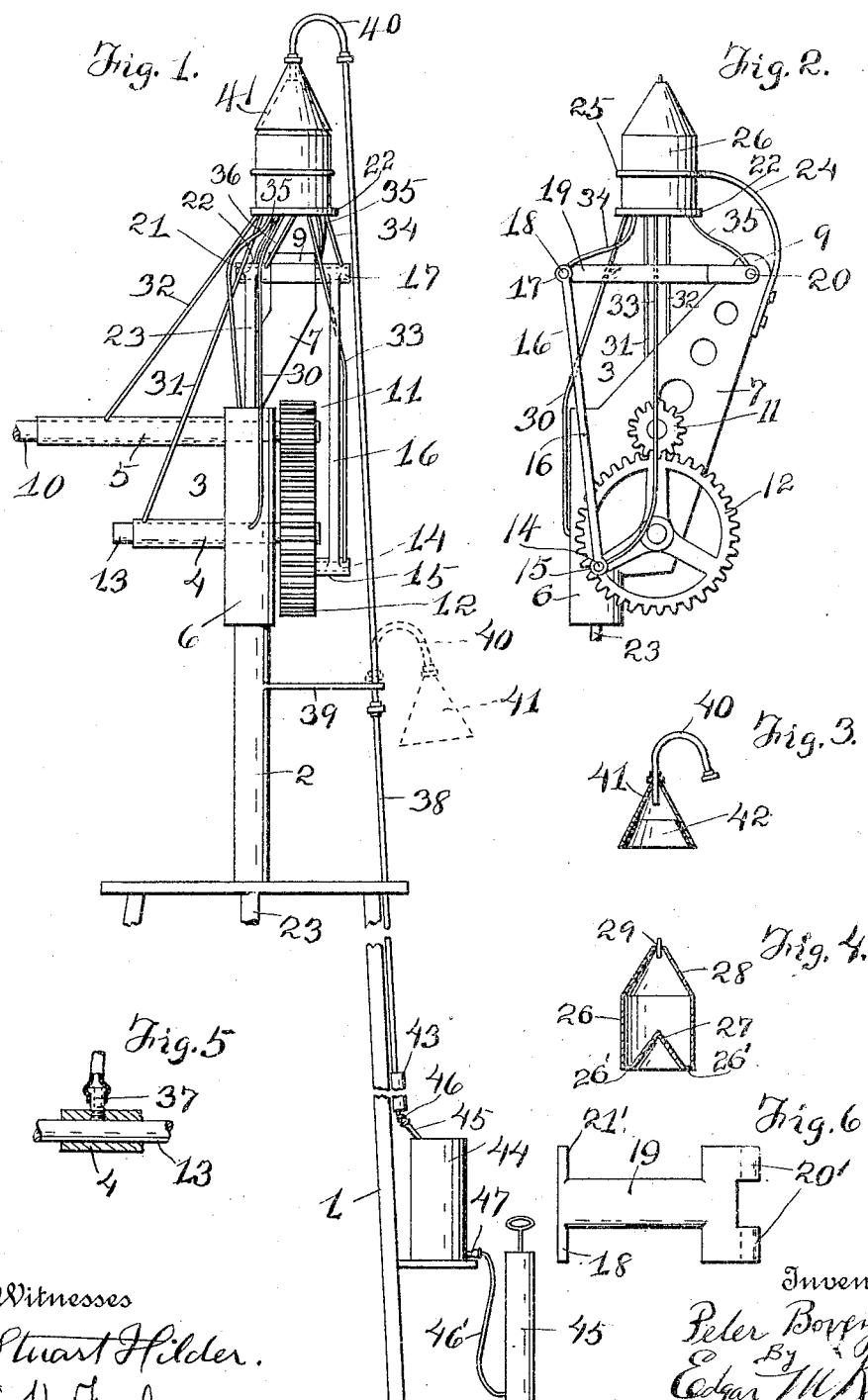

PETER BOVEY, OF OREGON, ILLINOIS.

OILER FOR WINDMILLS.

1,037,420.

Specification of Letters Patent.  Patented Sept. 3, 1912.

Application filed May 20, 1911. Serial No. 628,458.

*To all whom it may concern:*

Be it known that I, PETER BOVEY, a citizen of the United States, residing at Oregon, in the county of Ogle and State of Illinois, have invented certain new and useful Improvements in Oilers for Windmills; and I do hereby declare the following to be a full, clear, and exact description of the invention, such as will enable others skilled in the art to which it appertains to make and use the same.

This invention relates to improvements in oilers of the type especially adapted for oiling bearings of working parts of a wind mill.

An object in view is the economical and efficient distribution of oil in effective but not wasteful quantities.

A further object is the facilitating of the supplying of oil to the working parts of a wind mill without necessitating ascent of the wind mill tower by the operator.

With these and further objects in view as will in part hereinafter be set forth and in part become apparent, the invention comprises certain novel constructions, combinations and arrangements of parts as hereinafter specified and claimed.

In the accompanying drawing,—Figure 1 is a view in rear elevation of a wind mill tower and gearing with an illustrative embodiment of the present invention indicated as applied thereto, parts being broken away for the saving of space. Fig. 2 is a side elevation of the wheel cap and gearing detached. Figs. 3 and 4 are fragmentary, longitudinal central sections, respectively, of the hood and distributing container. Fig. 5 is a detail sectional view through any one bearing illustrating the nipple connection therewith. Fig. 6 is a detail plan view of the rocking arm detached.

It will be understood, of course, that the wind mill parts illustrated are merely conventional parts of a wind mill shown for the purpose of illustration, and the invention is just as applicable to any other type of wind mill, the sole alteration being in the number and relative arrangement of the distributing tubes from the distributing container.

Referring to the drawing by numerals, 1 indicates a tower of any ordinary type upon the top of which is sustained the usual pump rod containing tube 2 upon which is mounted the wind mill head 3 consisting of the usual rotatably mounted tubular support having the bearing sleeves 4 and 5 as well as the sleeve connection 6, and being formed with the outstanding and upstanding bracket plate 7 having journal bearing 9 at its upper end. The sleeve 5 constitutes the bearing for the shaft 10 of the wind wheel, which latter is not illustrated, the said shaft being journaled in said sleeve and at the opposite end from that carrying the wind wheel a pinion 11 is fixed to the shaft and meshes with the crank pinion 12 which is fixed to a shaft 13 journaled in sleeve 4. A wrist pin 14 outstanding from wheel 12 is surrounded by a sleeve 15 to which is fixed the pitman 16, which pitman extends thence upwardly to a sleeve 17 loosely surrounding a pin 18 outstanding laterally from a rocking lever 19, the opposite end of which lever is formed with eyes 20', 20' journaled on pins 20. Outstanding from the opposite side of lever 19 from that carrying pin 18 is a pin 21' surrounded by sleeve 21 carried by the upper end of pump rod 23.

A bar 24 is fixed to the bracket 7 and bent upwardly to a point above the operating parts described and has its free end formed into a loop or eye 25 of a size snugly receiving and sustaining the distributing container 26, said container resting on a platform 22 supported in any suitable manner, not illustrated. The container 26, as seen in detail in Fig. 4, is a receptacle, preferably cylindrical, which has the central portion of its bottom projecting upwardly within the container and forming a conical extension 27 therein adapted to cause fluid introduced into the container to be distributed around the lower outer portions of the bottom. The container is closed by a cover 28, preferably of conical form, and the apex of the cone is penetrated by a nipple 29 of relatively small diameter, said nipple extending through the thickness of the wall of the cover 28 and projecting above and below the same. Connected with the bottom of the receptacle 26, and communicating therewith, through apertures 26', 26', formed in the lower outer portion of the bottom, are flexible tubes in any number requisite for the supplying of oil to all of the moving parts. For instance, a tube 30 leads to the journal of sleeve 6, tube 31 to the journal of sleeve 4, tube 32 to the journal of sleeve 5, tube 33 to the journal of sleeve 15, tube 34 to the journal of sleeve 17, tubes 35 to the journal of eyes 20'.

and tube 36 to the journal of sleeve 21. This is obviously merely illustrative, and the tubes may be extended to any of the bearings requiring oil, and preferably to all of them.

Each of the tubes is flexible to accommodate relative movement of the parts, and the tubes may be made of rubber, or any other flexible substance, or in any manner rendered flexible for enabling the requisite movement.

In Fig. 5, I have illustrated a method of connection of the tubes to the respective journals consisting in employing a preferably metallic nipple 37 threaded into the sleeve or other structure constituting the respective journal bearing in position for discharging from the tube through the nipple against the particular journal.

An oil supply pipe 38 extends up the tower 1, and in operation is disposed with its upper end adjacent but below the wind wheel mechanism, the tube being extended through an eye in the outer end of a bracket arm 39 for being guided in vertical movements. To the upper end of the tube is fixed a goose neck or curved pipe 40, the free end of which carries a hood or funnel-shaped cap 41 conforming in contour to the shape of the upper end of the container 26. The free end of the goose neck 40 extends within the hood 41 in position for, in operation, surrounding the upwardly extending portion of the nipple 29. To avoid loss of pressure, a gasket 42 is disposed within the hood 41 and, in operation, engages the cover 28 and prevents the escape of air. When it is considered that the tube 38 and goose neck 40 have a passage-way for ordinary wind mills, preferably one-eighth of an inch in diameter, it will become apparent that the opening in nipple 29 is not large, and, therefore, practically no moisture will enter the container 26 even when the hood 41 is not thereon. The lower end of the tube 38 at times rests upon and communicates with a preferably transparent oil receptacle 43, the said pipe 38 being adapted to be readily lifted off of or placed upon and in communication with the receptacle 43. When the tube 38 is in communication with and rests upon the receptacle 43, the upper end thereof is lifted to a position where the free end of the goose neck is in the planes of the nipple 29 and may surround the nipple. A compressed air tank 44 is connected by a tube 45 with the receptacle 43 and a valve 46 controls the admission of compressed air from tank 44 to receptacle 43. The air tank 44 may receive its air from any suitable source, as, for instance, a pump 45 having a tube 46' connected with the tank 44 through a check valve 47.

In operation, assuming the parts to be in the position indicated in dotted lines in Fig. 1, the operator introduces into the receptacle 43 the requisite quantity of oil for one oiling, the size of the charge of oil being, of course, proportionate to the number and nature of parts to be oiled. The operator then lifts the tube 38 upwardly until the hood 14 is above the planes of the upper end of container 27. He then rotates the tube until the hood is disposed above the cover 28, whereupon the operator lowers the tube until its lower end assumes a position in communication with the receptacle 43, whereat the free end of the goose neck 40 will be found to surround and be in communication with the nipple 29. Thereupon the operator opens the valve 46, assuming that a sufficient charge of compressed air has already been accumulated in the tank 44, and the oil is blown from the receptacle 43 upwardly along the tube 48 into the distributing container 27, and as the oil is delivered under pressure it is rapidly and evenly distributed to the several tubes, and is thence delivered to the parts to be oiled. When all of the oil has been blown from the receptacle 43, the operator turns off the valve 46, lifts the tube 38 for clearing the hood 41 from cover 28, and rotates the shaft until the hood is entirely out of the way, and then lowers the tube to the position seen in dotted lines in Fig. 1, whereupon the oiling apparatus is entirely out of the way and not in danger of being injured by a bodily rotation of the wind wheel as might have been the case had the tube remained in the oiling position.

What I claim is:—

1. In an oiler for wind mills, the combination of a distributing container, distributing means connected with said container, the container being substantially entirely closed and having an oil receiving nipple, the top of the container being substantially conical and having the nipple projecting from the apex thereof, and a supply pipe adapted to be moved into and away from communicating relation with the nipple.

2. In an oiler for wind mills, the combination of a distributing container, means for distributing oil therefrom, the container having a substantially conical cover formed with a communicating opening at its upper end, a substantially funnel shaped hood adapted to be moved into and away from a position surrounding and inclosing said cover, and a supply pipe connected with said hood and adapted when the hood surrounds the cover to be disposed in communication with the opening of the container.

3. In an oiler for wind mills, the combination of a distributing container, means for distributing oil therefrom, a pipe adapted to detachably communicate with the container for supplying oil thereto under pressure, and a hood connected with said pipe and adapted to engage the container for preventing escape of pressure during the communication of the pipes with the container.

4. In an oiler for wind mills, the combination with a distributing container, distributing means connected therewith, an oil supply pipe adapted to detachably communicate with and deliver oil under pressure to the container, a hood connected to the pipe, and adapted, during the communication of the pipe with the container, to inclose a portion of the container surrounding the point of communication, and a gasket disposed between the hood and container for effecting a non-leaking connection.

5. In an oiler for wind mills, the combination of a distributing container, distributing means therefor, the container having a cover of substantially conical form, a nipple extending through the upper end of the cover, an oil supply pipe adapted to communicate with the nipple, a hood fixed to surround and extend below the end of the oil supply pipe in position for surrounding and engaging the conical cover of the container, the supply pipe being shiftable to and from a position in engagement with the nipple.

6. In an oiler for wind mills, the combination of a distributing container, distributing means therefor, an oil supply pipe adapted to deliver oil to the container and being slidably mounted, an oil supply receptacle adapted at times to be in communication with the pipe, and means for supplying air under pressure beneath the oil in the oil supply receptacle for forcing the same along the supply pipe into the container when the supply pipe is in communication with the receptacle.

7. In an oiler for wind mills, the combination with a distributing container, distributing means therefor, the said container being disposed above the planes of the axle of the wheel of the wind mill, an oil supply pipe disposed when out of operation below the plane of said axle and adapted to be moved upwardly until the upper end of said pipe is in communicating relation with the container, and means for supplying oil through said pipe.

8. In an apparatus of the class described, the combination with a distributing container and means for delivering oil therefrom, capable of delivery by gravity, of an oil receptacle, a communicating pipe between the oil receptacle and the distributing container connected to the upper portion of the oil receptacle, and means for subjecting the oil within the receptacle to an air blast from beneath in the direction toward the communicating pipe.

In testimony whereof I affix my signature in presence of two witnesses.

PETER BOVEY.

Witnesses:
 EVERETT L. REESE,
 J. F. STEFFA.